(12) United States Patent
Oosake

(10) Patent No.: US 12,499,510 B2
(45) Date of Patent: Dec. 16, 2025

(54) IMAGE PROCESSING APPARATUS, OPERATION METHOD OF IMAGE PROCESSING APPARATUS, AND ENDOSCOPE SYSTEM

(71) Applicant: FUJIFILM Corporation, Tokyo (JP)

(72) Inventor: Masaaki Oosake, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 235 days.

(21) Appl. No.: 18/454,773

(22) Filed: Aug. 23, 2023

(65) Prior Publication Data

US 2024/0070810 A1    Feb. 29, 2024

(30) Foreign Application Priority Data

Aug. 25, 2022  (JP) ................................. 2022-134466

(51) Int. Cl.
*G06T 3/4046* (2024.01)
*A61B 1/00* (2006.01)
*G06T 3/4053* (2024.01)

(52) U.S. Cl.
CPC ...... *G06T 3/4046* (2013.01); *A61B 1/000095* (2022.02); *G06T 3/4053* (2013.01); *A61B 1/00045* (2013.01)

(58) Field of Classification Search
None
See application file for complete search history.

(56) References Cited

U.S. PATENT DOCUMENTS

2023/0017738 A1\*  1/2023  Elliott-Bowman ......................... A61B 1/00039
2023/0142955 A1\*  5/2023  Issadore ............. C12N 15/1013
                                                                                435/6.14

FOREIGN PATENT DOCUMENTS

JP            2020024612          2/2020

\* cited by examiner

*Primary Examiner* — Darryl V Dottin
(74) *Attorney, Agent, or Firm* — JCIPRNET

(57) ABSTRACT

A processor generates a trained model by updating a learning model that uses an input image for training obtained by performing deterioration processing on a source image as input to output a first output image for training and a second output image for training, which have the number of pixels larger than the input image for training. A second intermediate layer of the learning model outputs a feature map to be input to a first output layer that outputs the first output image for training based on the feature map from a folded layer and a first intermediate layer. A third intermediate layer outputs the feature map to be input to a second output layer that outputs a second output image for training based on the feature map from the folded layer.

17 Claims, 10 Drawing Sheets

IMAGE PROCESSING APPARATUS, OPERATION METHOD OF IMAGE PROCESSING APPARATUS, AND ENDOSCOPE SYSTEM

CROSS-REFERENCE TO RELATED APPLICATIONS

This application claims priority under 35 U.S.C. § 119(a) to Japanese Patent Application No. 2022-134466 filed on 25 Aug. 2022. The above application is hereby expressly incorporated by reference, in its entirety, into the present application.

BACKGROUND OF THE INVENTION

1. Field of the Invention

The present invention relates to an image processing apparatus that performs super resolution on an image, an operation method of an image processing apparatus, and an endoscope system.

2. Description of the Related Art

Deep learning may be used in order to perform, with high accuracy, super resolution of increasing a resolution of an unknown image. For example, JP2020-24612A describes a neural network that outputs a high resolution image by inputting a low resolution image and a classification score. JP2020-24612A describes that the low resolution image used for data for training to be input to the neural network may be generated by downsampling the high resolution image. In addition, it is described that an image captured by a camera having a small number of pixels may be used as the low resolution image, and an image captured by a camera having a large number of pixels of the same subject may be used as the high resolution image.

SUMMARY OF THE INVENTION

In order to train deep learning to generate an image having a high resolution, it is desirable to prepare a high resolution image as a source image for training. However, it may not be possible to prepare the source image for training having a high image quality depending on the specifications of an apparatus that captures or generates the source image. Obtaining a super resolution image having a resolution higher than a resolution of the source image by using the deep learning is particularly difficult in a case in which such a source image cannot be obtained. In addition, in a case in which the source image having a high resolution cannot be prepared, the super resolution image generated by the deep learning may not appropriately reflect a feature of a deteriorated image to be input to the deep learning before super resolution processing is performed.

The present invention is to provide an image processing apparatus that can perform, with high accuracy, super resolution of generating an image having a resolution equal to or higher than a resolution of an image used for training of machine learning, an operation method of an image processing apparatus, and an endoscope system.

An aspect of the present invention relates to an image processing apparatus comprising a processor, in which the processor acquires a source image, generates an input image for training by deterioration processing on the source image, inputs the input image for training to a learning model to output a first output image for training and a second output image for training which have the number of pixels larger than the number of pixels of the input image for training, calculates a first loss based on the first output image for training and the source image, calculates a second loss based on the second output image for training and the source image, and updates the learning model based on the first loss and the second loss to generate a trained model, the learning model includes an input layer, a first intermediate layer, a folded layer, a second intermediate layer, a first output layer, a third intermediate layer, and a second output layer, the input layer receives input of the input image for training to output a feature map to be input to the first intermediate layer, the first intermediate layer receives input of the feature map output from the input layer to output the feature map to be input to the folded layer and the second intermediate layer, the folded layer outputs the feature map to be input to the second intermediate layer and the third intermediate layer based on the feature map input from the first intermediate layer, the second intermediate layer outputs the feature map to be input to the first output layer based on the feature map input from the folded layer and the feature map input from the first intermediate layer, the first output layer outputs the first output image for training based on the feature map input from the second intermediate layer, the third intermediate layer outputs the feature map to be input to the second output layer based on the feature map input from the folded layer, and the second output layer outputs the second output image for training based on the feature map input from the third intermediate layer.

It is preferable that information amounts of the input image for training, the first output image for training, the second output image for training, and the feature map are decided by the number of pixels, the number of channels, and the number of bits according to a data type, and the folded layer makes the information amount of the feature map output from the folded layer smaller than the information amount of the input image for training by performing information amount reduction processing of changing the number of channels or the number of bits.

It is preferable that the information amount reduction processing is processing of reducing the number of channels. It is preferable that the information amount reduction processing is processing of reducing the number of bits.

It is preferable that the first intermediate layer performs processing of reducing the number of pixels of the feature map input from the input layer.

It is preferable that the second intermediate layer and the third intermediate layer perform processing of increasing the number of pixels of the feature map input from the folded layer.

It is preferable that the deterioration processing includes processing of reducing the number of pixels of the source image. It is preferable that the deterioration processing includes filter processing and/or noise addition processing. It is preferable that the processor further inputs the input image for training to the second intermediate layer.

It is preferable that the processor inputs an input image for inference having a first number of pixels to the trained model to output a super resolution image having a second number of pixels larger than the first number of pixels, and a ratio of the second number of pixels to the first number of pixels is equal to a ratio of the number of pixels of the first output image for training and the second output image for training to the number of pixels of the input image for training.

Another aspect of the present invention relates to an operation method of an image processing apparatus, the method comprising a step of acquiring a source image, a step of generating an input image for training by deterioration processing on the source image, a step of inputting the input image for training to a learning model to output a first output image for training and a second output image for training which have the number of pixels larger than the number of pixels of the input image for training, a step of calculating a first loss based on the first output image for training and the source image, a step of calculating a second loss based on the second output image for training and the source image, and a step of updating the learning model based on the first loss and the second loss to generate a trained model, in which the learning model includes an input layer, a first intermediate layer, a folded layer, a second intermediate layer, a first output layer, a third intermediate layer, and a second output layer, the input layer receives input of the input image for training to output a feature map to be input to the first intermediate layer, the first intermediate layer receives input of the feature map output from the input layer to output the feature map to be input to the folded layer and the second intermediate layer, the folded layer outputs the feature map to be input to the second intermediate layer and the third intermediate layer based on the feature map input from the first intermediate layer, the second intermediate layer outputs the feature map to be input to the first output layer based on the feature map input from the folded layer and the feature map input from the first intermediate layer, the first output layer outputs the first output image for training based on the feature map input from the second intermediate layer, the third intermediate layer outputs the feature map to be input to the second output layer based on the feature map input from the folded layer, and the second output layer outputs the second output image for training based on the feature map input from the third intermediate layer.

Still another aspect of the present invention relates to an image processing apparatus comprising a processor, in which the processor acquires a source image, generates an input image for training by deterioration processing on the source image, inputs the input image for training to a generator to output a first output image for training and a second output image for training which have the number of pixels larger than the number of pixels of the input image for training, inputs the first output image for training and the second output image for training to a discriminator to output a first discrimination result based on the first output image for training and a second discrimination result based on the second output image for training, calculates a first discriminator loss based on the first discrimination result and a second discriminator loss based on the second discrimination result, updates the discriminator based on the first discriminator loss and the second discriminator loss, calculates a first generator loss based on the first discrimination result and the source image and a second generator loss based on the second discrimination result and the source image, and updates the generator based on the first generator loss and the second generator loss to generate a trained generator, the generator includes an input layer, a first intermediate layer, a folded layer, a second intermediate layer, a first output layer, a third intermediate layer, and a second output layer, the input layer receives input of the input image for training to output a feature map to be input to the first intermediate layer, the first intermediate layer receives input of the feature map output from the input layer to output the feature map to be input to the folded layer and the second intermediate layer, the folded layer outputs the feature map to be input to the second intermediate layer and the third intermediate layer based on the feature map input from the first intermediate layer, the second intermediate layer outputs the feature map to be input to the first output layer based on the feature map input from the folded layer and the feature map input from the first intermediate layer, the first output layer outputs the first output image for training based on the feature map input from the second intermediate layer, the third intermediate layer outputs the feature map to be input to the second output layer based on the feature map input from the folded layer, and the second output layer outputs the second output image for training based on the feature map input from the third intermediate layer.

Still another aspect of the present invention relates to an image processing apparatus comprising a processor, in which the processor acquires an endoscope image having a first number of pixels, and inputs the endoscope image to a trained model to output a super resolution image having a second number of pixels larger than the first number of pixels, and the trained model is generated by updating a learning model that uses an input image for training, which is generated by performing deterioration processing on a source endoscope image having a third number of pixels equal to or smaller than the first number of pixels and has a fourth number of pixels smaller than the third number of pixels, to output a first output image for training and a second output image for training which have a fifth number of pixels larger than the fourth number of pixels, based on a first loss based on the first output image for training and the source endoscope image and a second loss based on the second output image for training and the source endoscope image.

It is preferable that the processor performs control of displaying the super resolution image and information indicating that the endoscope image is subjected to high resolution processing.

It is preferable that a ratio of the second number of pixels to the first number of pixels is equal to a ratio of the fifth number of pixels to the fourth number of pixels. It is preferable that the third number of pixels is equal to the first number of pixels.

Still another aspect of the present invention relates to an endoscope system comprising the image processing apparatus described above, an endoscope that images a subject to generate the endoscope image, and a display, in which the processor performs control of displaying the super resolution image on the display.

According to the present invention, it is possible to perform, with high accuracy, the super resolution of generating the image having a resolution equal to or higher than a resolution of the image used for training of the machine learning.

DESCRIPTION OF THE PREFERRED EMBODIMENTS

Figure 1:
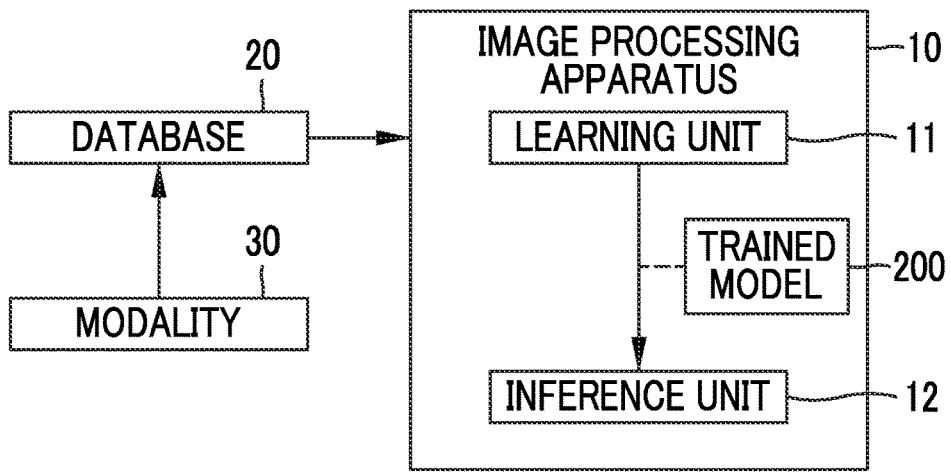
FIG. 1 is a block diagram showing a function of an image processing apparatus.

As shown in FIG. 1, an image processing apparatus 10 includes a learning unit 11 and an inference unit 12. The learning unit 11 generates a trained model 200 by optimizing a parameter of the learning model 100 to which machine learning is applied, by using a source image for training input from a database 20 to the image processing apparatus 10.

The machine learning applied to the learning model 100 includes a decision tree, a support vector machine, a random forest, a regression analysis, deep learning, reinforcement learning, deep reinforcement learning, a neural network, a convolutional neural network, a generative adversarial network, and the like. A specific configuration of the learning model 100 will be described below.

The inference unit 12 inputs, to the trained model 200 generated in the learning unit 11, an input image for inference, which is an unknown image different from the source image and transmitted from the database 20, to generate a super resolution image having a feature of the unknown image and having a resolution higher than a resolution of the unknown image. The details will be described below, but the number of pixels of the input image for inference to be input to the trained model 200 is equal to the number of pixels of the source image used for training, or is larger than the number of pixels of the source image.

The database 20 stores the source image used for training of the learning model 100 and the input image for inference, which is the original image for generating the super resolution image by inference of the trained model. The database 20 is a storage for storing an image, a file server, a cloud storage, and the like. The database 20 may be a part of a system that directly or indirectly cooperates with the image processing apparatus 10, such as hospital information systems (HIS) or picture archiving and communication systems (PACS).

The source image or the input image for inference stored in the database 20 is transmitted from a modality 30. The image processing apparatus 10 according to the present embodiment is suitable in a case in which the modality 30 is a medical image generation apparatus, such as an endoscope, a radiography apparatus, or an ultrasound imaging apparatus that generates a medical image. The medical image is an endoscope image, a radiation image, an ultrasound image, or the like. In addition, the image processing apparatus 10 according to the present embodiment is particularly suitable in a case in which the modality 30 is the endoscope and the source image and the input image for inference are the endoscope images. An example in which the source image and the input image for inference are the endoscope image will be described below.

The image processing apparatus 10, the database 20, and the modality 30 are connected to each other to be able to communicate with each other by wire or wirelessly. The wireless connection includes a network connection, and is, for example, the Internet or a local area network (LAN).

Figure 2:
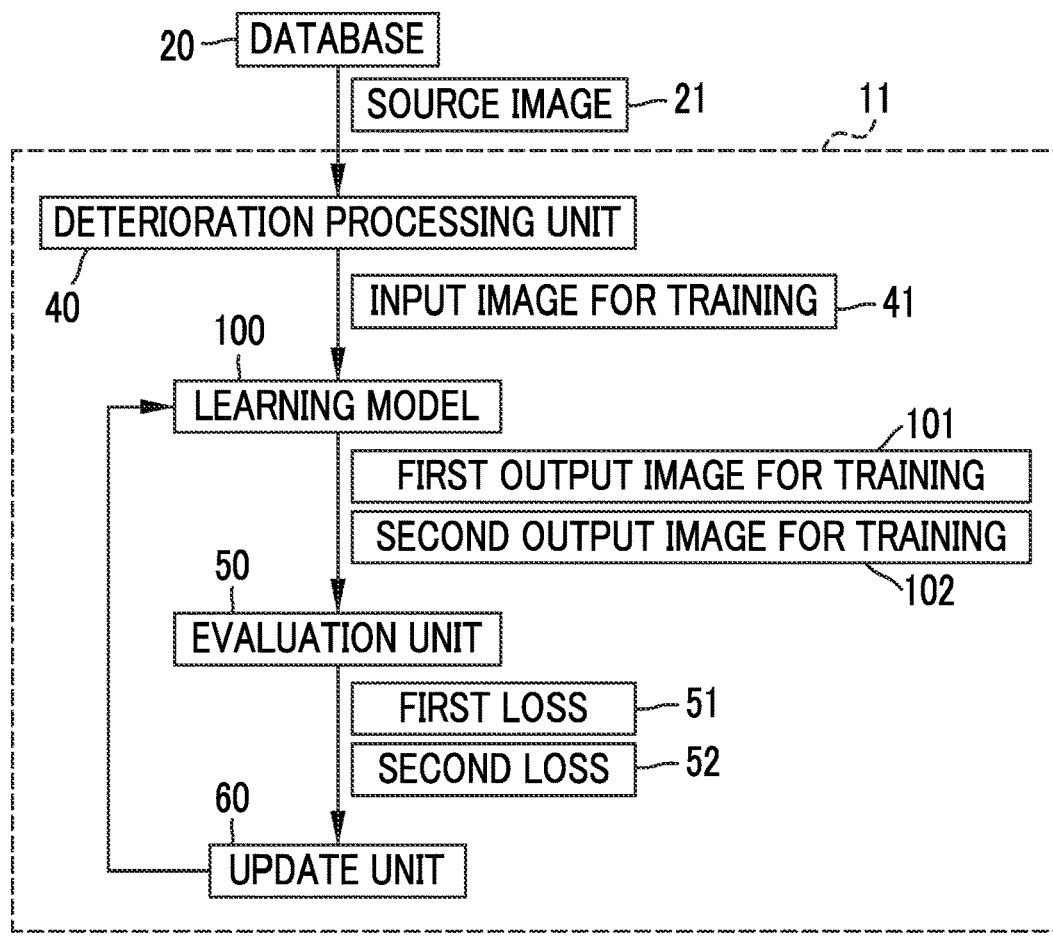
FIG. 2 is a block diagram showing a function of a learning unit.
Figure 3:
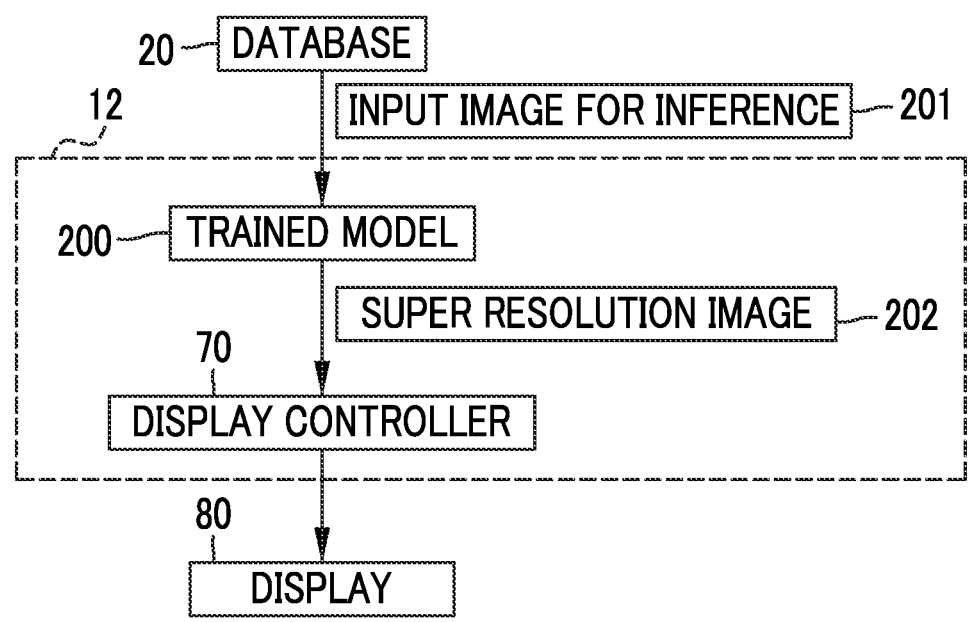
FIG. 3 is a block diagram showing a function of an inference unit.

As shown in FIG. 2, the learning unit 11 includes a deterioration processing unit 40, a learning model 100, an evaluation unit 50, and an update unit 60. In addition, as shown in FIG. 3, the inference unit 12 includes the trained model 200 generated by training the learning model 100 and a display controller 70. In the image processing apparatus 10, programs related to various types of processing are incorporated in a program memory (not shown). A controller (not shown) composed of a processor executes the program in the program memory to realize functions of a deterioration processing unit 40, the learning model 100, the evaluation unit 50, and the update unit 60 of the learning unit 11, and the trained model 200 and the display controller 70 of the inference unit 12.

It should be noted that the image processing apparatus 10 may be configured such that the learning unit 11 and the inference unit 12 may be separately provided in different apparatuses to communicate with each other. In addition, the image processing apparatus 10 may be configured such that the respective component units of the learning unit 11 and the inference unit 12 may be separately provided in different apparatuses to communicate with each other. In this case, each apparatus is provided with the controller composed of the processor.

As shown in FIG. 2, the database 20 inputs a source image 21 to the deterioration processing unit 40 of the learning unit 11. The deterioration processing unit 40 performs deterioration processing on the source image 21 to generate an input image for training 41 having the number of pixels smaller than the number of pixels of the source image 21. The deterioration processing is resolution reduction processing of, on the source image 21, reducing the number of pixels of the source image 21. The number of pixels is the number of pixels of one image, which is represented by a width and a height of the image, and is also referred to as the pixel number. It should be noted that, in the present specification, the wording of "the number of pixels" is used as the wording meaning "resolution". As the number of pixels of the image is larger, the resolution of the image is higher, and a complicated structure can be represented in detail. On the other hand, as the number of pixels of the image is smaller, the resolution is lower, resulting in a rough image with a blurred outline.

The deterioration processing includes filter processing and/or noise addition processing on the source image 21. The filter processing is processing of applying a filter, such as a Gaussian filter, an averaging filter, a median filter, or a bilateral filter, to the source image, and deteriorating the source image 21 by blurring or reduction. The noise addition processing is processing of deteriorating the source image 21 by adding noise through processing of randomly setting a pixel value of the pixel of the source image 21 to a maximum value or a minimum value, processing of changing the brightness of the pixel of the source image 21 by a random number, or the like.

The input image for training 41 obtained by the deterioration processing is input to the learning model 100. The learning model 100 performs feature extraction and high resolution processing on the input image for training 41, and outputs a first output image for training 101 and a second output image for training 102. Since the learning model 100 performs the high resolution processing on the input image for training 41, the first output image for training 101 and the second output image for training 102 have the number of pixels larger than the number of pixels of the input image for training 41. The learning model 100 includes one input layer, two intermediate layers, and two output layers. Details of the two intermediate layers and the two output layers of the learning model 100 in the present embodiment will be described below.

The evaluation unit 50 applies the first output image for training 101 and the source image 21 to a loss function that is a model for evaluation, and calculates a first loss 51. Also, the second output image for training 102 and the source image 21 are applied to the loss function to calculate a second loss 52. It is preferable to use a mean squared error (MSE) in the calculation of the first loss 51 and the second loss 52. As the first loss 51 is smaller, a difference between the first output image for training 101 and the source image 21 is smaller. In addition, as the second loss 52 is smaller, a difference between the second output image for training 102 and the source image 21 is smaller. As the loss is closer to "0", the output accuracy of the learning model 100 is higher. Hereinafter, the wording "loss" will be used as the wording indicating either or both of the first loss 51 and the second loss 52.

The update unit 60 sets a parameter of the learning model 100 such that the loss approaches "0" (such that the loss is minimized), and updates the parameter. The calculation of the loss performed by the evaluation unit 50 and the update of the parameter performed by the update unit 60 are repeated until the first loss 51 and the second loss 52 are values set in advance. A value for indicating the termination of the calculation of the loss and the update of the parameter may be a value within a certain range, may be equal to or larger than a certain threshold value, or may be smaller than the certain threshold value. The training of the learning model 100, that is, the generation of the trained model 200 means parameter optimization processing of minimizing the loss. The optimized parameter is used as a parameter of the trained model 200 in the inference unit 12. It should be noted that the image processing apparatus 10 may be provided with a parameter storage memory (not shown) for storing the parameter.

As shown in FIG. 3, the trained model 200 generated by the training of the learning model 100 performs the feature extraction and the high resolution processing on an input image for inference 201 transmitted from the database 20 to output a super resolution image 202. It should be noted that the super resolution refers to the high resolution processing of generating a high resolution image from a low resolution image that is an input signal.

The super resolution image 202 output by the trained model 200 is transmitted to the display controller 70. The display controller 70 performs display signal processing of displaying the super resolution image 202 on a display 80, and performs control of displaying the super resolution image 202 on the display 80.

A configuration of the learning model 100 will be described below with reference to FIG. 4. It is preferable to apply a convolutional neural network (CNN) to the learning model 100.

Figure 4:
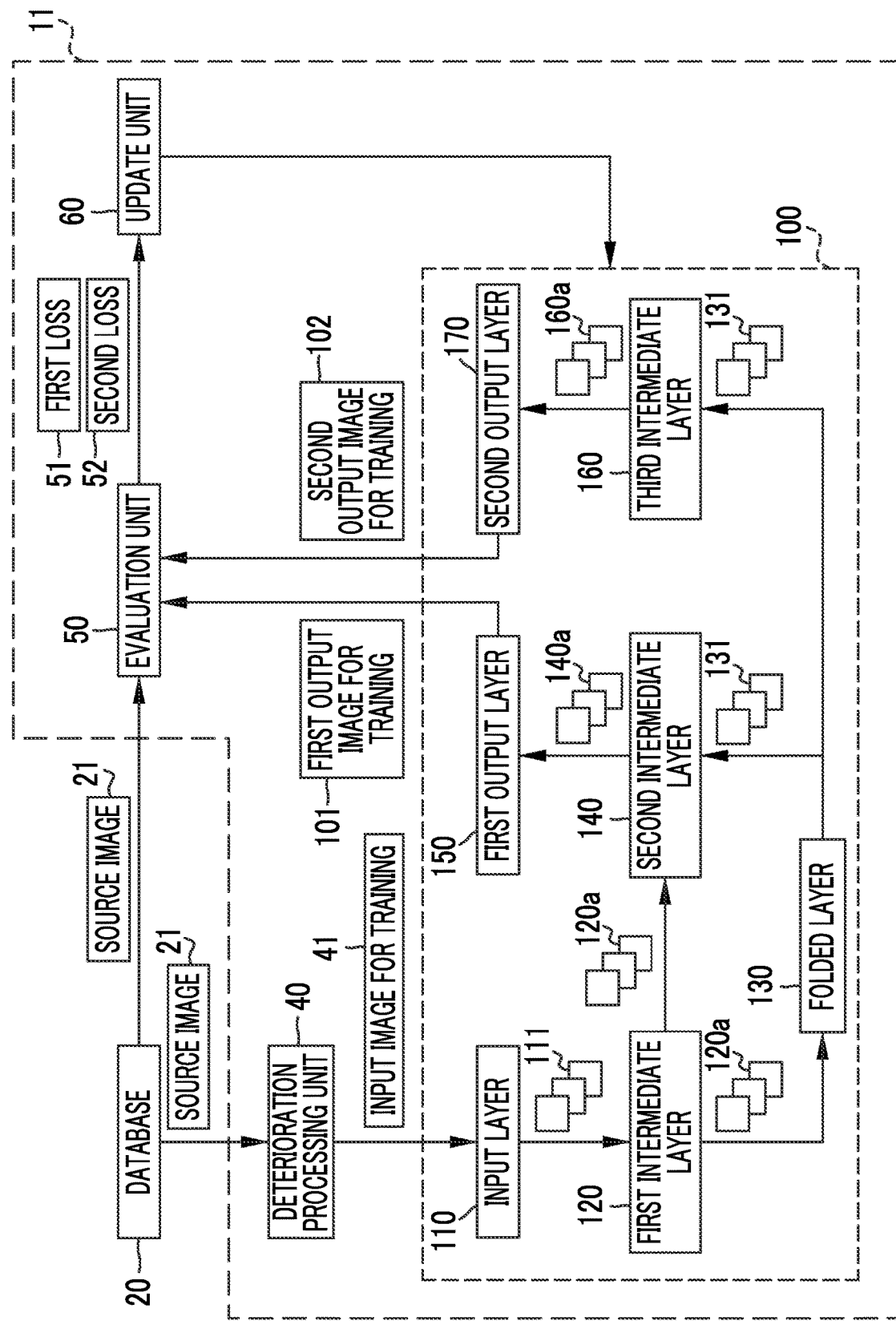
FIG. 4 is a block diagram showing a function of a learning model.

As shown in FIG. 4, the learning model 100 includes an input layer 110, a first intermediate layer 120, a folded layer 130, a second intermediate layer 140, a first output layer 150, a third intermediate layer 160, and a second output layer 170.

A network composed of the input layer 110, the first intermediate layer 120, and the folded layer 130 is a network that performs the feature extraction for the input image for training 41, and is a network corresponding to an encoder of a model having an encoder-decoder structure.

The input layer 110 receives the input of the input image for training 41 from the deterioration processing unit 40 to output a feature map 111 to be input to the first intermediate layer 120. It is preferable that a data type of the input image for training 41 is an integer type and a data type of the feature map 111 is a floating point. The conversion of the data type of the input image for training 41 from the integer type to the floating point may be performed by the deterioration processing unit 40, may be performed at a stage from the deterioration processing unit 40 to the input to the input layer 110, or may be performed at a stage from the input layer 110 to the input to a convolutional layer, which will be described below.

The first intermediate layer 120 receives the input of the feature map 111 output by the input layer 110 to output a feature map 120a to be input to the folded layer 130 and the second intermediate layer 140. The first intermediate layer 120 outputs the feature map 120a in which the feature of the input image for training 41 is extracted by performing convolution and/or pooling on the feature map 111.

The convolution is processing of applying the filter to the input image data and extracting (outputting) the feature map indicating at which position of the input image data the pattern of the filter is located. The filter is also referred to as a convolutional kernel or simply a kernel. The number of pixels of the feature map extracted by the convolution can be set to be the same as or smaller than the number of pixels of the input feature map, by setting padding that interpolates the pixel values around the image data and an application interval (stride) of the filter with respect to the image data. It should be noted that, in the present specification, the wording of "feature map" is also used as the wording meaning "feature amount".

The pooling is processing of summarizing values of local regions belonging to each feature map and reducing the number of pixels of the feature map which is the image data. The local region refers to a region composed of a plurality of pixels centered on one pixel in the feature map. The pooling includes max pooling, average pooling, and the like. The max pooling is processing of selecting a maximum value from among the pixel values of the pixels included in the local region and using the selected maximum value as the pixel value of the pixel of the feature map to be output. The average pooling is processing of selecting an average value of the pixel values of the pixels included in the local region and using the selected average value as the pixel value of the pixel of the feature map to be output. The processing of reducing the number of pixels of the feature map by the convolution or the pooling is also referred to as downsampling. It is preferable that the first intermediate layer 120 reduces the number of pixels of the feature map input from the input layer 110 by downsampling.

The folded layer 130 outputs a feature map 131 to be input to the second intermediate layer 140 and the third intermediate layer 160 based on the feature map 120a input from the first intermediate layer 120. The folded layer 130 performs the convolution and/or the pooling on the feature map 120a in the same manner as in the first intermediate layer 120.

The number of pixels of the feature map 131 output from the folded layer 130 may be the same as the number of pixels of the input image for training 41, but is preferably smaller than the number of pixels of the input image for training 41 in order to speed up output processing in training and inference.

A network composed of the second intermediate layer 140 and the first output layer 150 further performs the high resolution processing on the feature map 131, which is output from the folded layer 130 and has the feature of the input image for training 41, by using the feature map 120a output from the first intermediate layer 120, and outputs the first output image for training 101 having the number of pixels larger than the number of pixels of the input image for training 41. A network composed of the second intermediate layer 140 and the first output layer 150 corresponds to a decoder of the model having the encoder-decoder structure.

As shown in FIG. 4, the learning model 100 according to the present embodiment includes two decoders. A network composed of the second intermediate layer 140 and the first output layer 150 is a first decoder. In addition, a network composed of the third intermediate layer 160 and the second output layer 170, which will be described below, is a second decoder.

The second intermediate layer 140 outputs a feature map 140a to be input to the first output layer 150 based on the feature map 131 input from the folded layer 130 and the feature map 120a input from the first intermediate layer 120. The high resolution processing includes upsampling of arranging the pixel values related to the pixels constituting the feature map at some pixel intervals and interpolating the pixel values therebetween, and upconvolution that combines the upsampling and the convolution without interpolating the pixel values. The upsampling is also referred to as unpooling, and the upconvolution is also referred to as transposed convolution or deconvolution. The second intermediate layer 140 and the third intermediate layer 160, which will be described below, perform processing of increasing the number of pixels of the feature map 131 input from the folded layer 130 by the upsampling or the upconvolution.

The feature map 120a output from the first intermediate layer 120 is skip-connected to the second intermediate layer 140. By the skip connection, a feature map in which the feature map 131 and the feature map 120a are subjected to the high resolution processing is output from the second intermediate layer 140 as the feature map 140a.

That is, focusing on the encoder composed of the input layer 110, the first intermediate layer 120, and the folded layer 130, and the first decoder composed of the second intermediate layer 140 and the first output layer 150, the first intermediate layer 120 and the second intermediate layer 140 form a network referred to as a U-net that has a symmetrical shape. In the U-net, since the feature amount output from the intermediate layer of the encoder can be shared by the decoder by connecting the layer of the encoder and the corresponding layer of the decoder, it is generally known that the output of the decoder can be made with significantly high accuracy.

In the learning model 100 according to the present embodiment, by connecting the feature map 120a output from the first intermediate layer 120 to the second intermediate layer 140, the feature map 131 having the feature of the input image for training 41 can be subjected to the high resolution processing with high efficiency and high accuracy. The folded layer 130 is a layer at the rearmost stage of the encoder, and is a layer corresponding to the bottom of the U-shape, that is, the "folding" of the U-net.

The first output layer 150 outputs the first output image for training 101 based on the feature map 140a input from the second intermediate layer 140. The first output layer 150 outputs the first output image for training 101 by applying an activation function, such as a rectified linear unit (ReLU) function, to the feature map 140a. It should be noted that the activation function is also applied to a feature map in which the convolution is performed in the first intermediate layer 120, the second intermediate layer 140, and the third intermediate layer 160. The first output image for training 101 output from the first output layer 150 is transmitted to the evaluation unit 50.

It is preferable that a data type of the feature map 140a is a floating point and a data type of the first output image for training 101 is an integer type. The conversion of the data type of the first output image for training 101 from the floating point to the integer type may be performed in the first output layer 150 or may be performed at a stage from the first output layer 150 to the input to the evaluation unit 50.

The network, which is the second decoder composed of the third intermediate layer 160 and the second output layer 170, performs the high resolution processing on the feature map 131 output from the folded layer 130 to output the second output image for training 102 having the number of pixels larger than the number of pixels of the input image for training 41.

In the second decoder, the third intermediate layer 160 outputs a feature map 160a to be input to the second output layer 170 based on the feature map 131. In the third intermediate layer 160, unlike the second intermediate layer 140, the skip connection of the feature map 120a output from the first intermediate layer 120 is not performed.

The second output layer 170 outputs the second output image for training 102 based on the feature map 160a input from the third intermediate layer 160. The second output layer 170 outputs the second output image for training 102 by applying the activation function to the feature map 160a. The second output image for training 102 is transmitted to the evaluation unit 50.

It is preferable that a data type of the feature map 160a is a floating point and a data type of the second output image for training 102 is an integer type. The conversion of the data type of the second output image for training 102 from the floating point to the integer type may be performed in the second output layer 170 or may be performed at a stage from the second output layer 170 to the input to the evaluation unit 50.

The evaluation unit 50 calculates the first loss 51 by applying the first output image for training 101 output from the first output layer 150 and the source image 21 transmitted from the database 20 to the loss function to perform the comparison. In addition, the evaluation unit 50 calculates the second loss 52 by applying the second output image for training 102 output from the second output layer 170 and the source image 21 transmitted from the database 20 to the loss function to perform the comparison. In this way, the loss is used in the parameter optimization processing by the update unit 60.

As described above, by performing training by configuring the learning model 100 such that the second decoder to which the feature map 120a from the encoder is not connected is provided in addition to the first decoder to which the feature map 120a from the encoder is connected, it is possible to update the parameter of the encoder such that the encoder can extract a more important feature of the input image for training 41. In a case in which the parameter of the encoder is updated in this way, the parameters of the first decoder and the second decoder are also updated to output the image which more strongly reflects the feature of the input image for training 41 and is subjected to the high resolution processing.

Figure 5:
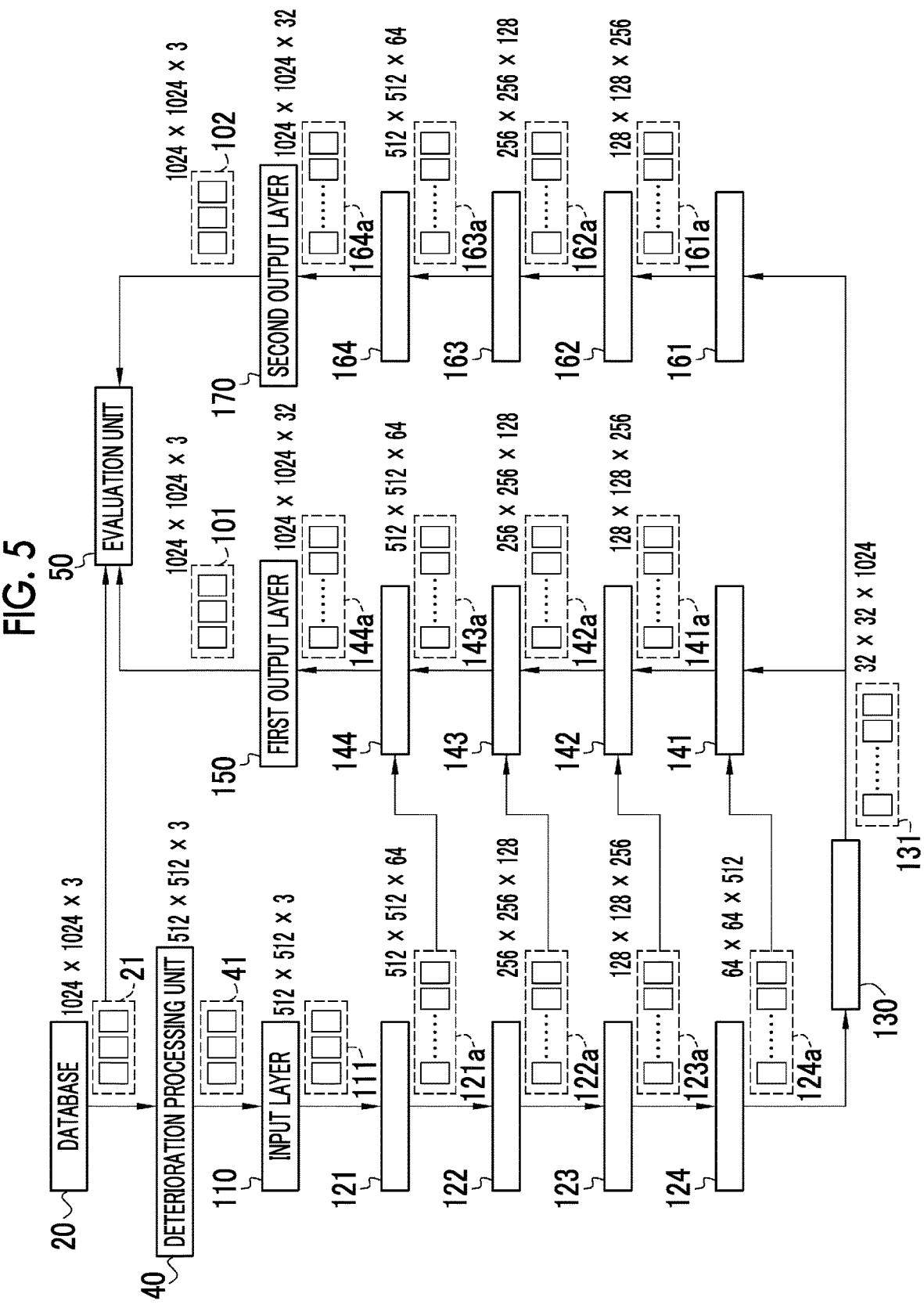
FIG. 5 is an explanatory diagram showing functions of a first intermediate layer, a second intermediate layer, and a third intermediate layer.

The configuration and the function of the learning model 100 will be described in more detail with reference to FIG. 5. As shown in FIG. 5, the first intermediate layer 120 includes a plurality of convolutional layers 121, 122, 123, and 124 that perform the convolution. The second intermediate layer 140 includes a plurality of upsampling layers 141, 142, 143, and 144 that perform the high resolution processing. In addition, the third intermediate layer 160 also includes a plurality of upsampling layers 161, 162, 163, and 164. Although the description is omitted in FIG. 5, it is preferable that the second intermediate layer 140 and the third intermediate layer 160 are provided with the convolutional layer at a rear stage of each upsampling layer. In addition, the first intermediate layer 120 may be provided with a pooling layer that performs the pooling at a rear stage of each convolutional layer.

In FIG. 5, the network in which the first intermediate layer 120, the second intermediate layer 140, and the third intermediate layer 160 each have four convolutional layers or upsampling layers is described, but the number of convolutional layers or upsampling layers of the first intermediate layer 120, the second intermediate layer 140, and the third intermediate layer 160 is not limited to this. It should be noted that the number of upsampling layers of the third intermediate layer 160 is preferably the same as the number of upsampling layers of the second intermediate layer 140.

Hereinafter, an information amount of each image data input and output in the learning model 100 will be described. The information amount of the image data is the number of elements or a memory amount. The number of elements is decided by the number of pixels of each image included in the image data and the number of channels of the image data. As a specific example, the number of elements is (number of pixels)×(number of channels). The memory amount is decided by the number of pixels of each image included in the image data, the number of channels of the image data, and the number of bits according to the data type of each image. As a specific example, the memory amount is (number of pixels)×(number of channels)×(number of bits).

The integer type and the floating point are data types for processing the image data. The integer type includes byte, short, int, long, and the like, and the floating point includes float, double, and the like. In addition, the integer type includes an unsigned integer type representing a positive integer and a signed integer type capable of representing a positive integer and a negative integer. The number of bits according to the data type varies depending on the programming language, and is, for example, 8 bits in a case in which the data type is "unsigned int8" and 32 bits in a case in which the data type is "float32".

In FIG. 5, a specific example of the number of elements is added to the right shoulder of each image data. For example, the number of elements of the source image 21 transmitted from the database 20 to the deterioration processing unit 40 and the evaluation unit 50 is "1024×1024×3". It is indicated that the number of pixels (width×height) is "1024×1024" and the number of channels is "3". FIG. 5 shows an example in which the source image 21 is a color image, and thus the number of channels is "3" indicating that there are three types of channels, R channel, G channel, and B channel. It should be noted that, in a case in which the source image 21 is a monochrome image, the number of channels is "1".

The number of elements of the input image for training 41 generated by performing the deterioration processing in the deterioration processing unit 40 is "512×512×3" because the number of pixels is smaller than the number of pixels of the source image 21. The number of elements of the feature map 111 input from the input layer 110 to the convolutional layer 121 of the first intermediate layer 120 is "512×512×3". Here, in a case in which the data type of the feature map 111 is unsigned int8, the memory amount of the feature map 111 is 6,291,456 bits (512×512×3×8). In a case in which the data type of the feature map 111 is converted from unsigned int8 to float32, the memory amount of the feature map 111 is 25,165,824 bits (512×512×3×32).

In the convolutional layers 121, 122, 123, and 124 and the folded layer 130 included in the encoder, the convolution of the feature map is performed stepwise to obtain feature maps 121a, 122a, 123a, 124a, and 131. In the example shown in FIG. 5, a feature map having a smaller number of pixels in which the feature is extracted is output as the convolutional layer is located closer to a rear stage.

Specifically, the number of elements of the feature map 121a is "512×512×64", and the memory amount is 536,870,912 bits (512×512×64×32). The number of elements of the feature map 122a is "256×256×128", and the memory amount is 268,435,456 bits (256×256×128×32). The number of elements of the feature map 123a is "128×128×256", and the memory amount is 134,217,728 bits (128×128×256×32). The number of elements of the feature map 124a is "64×64×512", and the memory amount is 67,108,864 bits (64×64×512×32). The number of elements of the feature map 131 is "32×32×1024", and the memory amount is 33,554,432 bits (32×32×1024×32).

In general, in the feature extraction in the convolutional neural network, the number of channels of the feature map output from each convolutional layer is increased stepwise in order to maintain the information amount. It should be noted that the number of channels of the feature map to be output corresponds to the number of filters used in each convolutional layer.

For example, in the example shown in FIG. 5, in the convolutional layer 124, 512 filters are applied to the feature map 123a, so that the number of channels of the feature map 124a to be output is "512". In the folded layer 130 in which the feature extraction is performed at the rearmost stage of the encoder, 1024 filters are applied to the feature map 124a, so that the number of channels of the feature map 131 to be output is "1024".

In the encoder and the first decoder which are the U-net, the feature maps 121a, 122a, 123a, and 124a output from the convolutional layers 121, 122, 123, and 124 of the first intermediate layer 120 are input to the upsampling layers 141, 142, 143, and 144 of the second intermediate layer 140, respectively, by skip connection.

In the upsampling layers 141, 142, 143, and 144 included in the first decoder, the high resolution processing of the feature map is performed stepwise to obtain feature maps 141a, 142a, 143a, and 144a. In the example shown in FIG. 5, the feature map having a larger number of pixels, which is subjected to the high resolution processing, is output as the upsampling layer is located closer to a rear stage.

The upsampling layer 141 receives the input of the feature map 131 from the folded layer 130 and the feature map 124a output from the corresponding convolutional layer 124 to output the feature map 141a. The number of elements of the feature map 141a is "128×128×256", and the memory amount is 134,217,728 bits (128×128×256×32).

The upsampling layer 142 receives the input of the feature map 141a and the feature map 123a output from the corresponding convolutional layer 123 to output the feature map 142a. The number of elements of the feature map 142a is "256×256×128", and the memory amount is 268,435,456 bits (256×256×128×32).

The upsampling layer 143 receives the input of the feature map 142a and the feature map 122a output from the corresponding convolutional layer 122 to output the feature map 143a. The number of elements of the feature map 143a is "512×512×64", and the memory amount is 536,870,912 bits (512×512×64×32).

The upsampling layer 144 receives the input of the feature map 143a and the feature map 121a output from the corresponding convolutional layer 121 to output the feature map 144a. The number of elements of the feature map 144a is "1024×1024×32", and the memory amount is 1,073,741,824 bits (1024×1024×32×32).

It should be noted that the input image for training 41 may be further input to the upsampling layer 144, which is the upsampling layer one stage before the first output layer 150. By using the input image for training 41 for the high resolution processing, the output of the first decoder can be made with higher accuracy. It should be noted that, in a case in which the input image for training 41 is input to the upsampling layer 144, it is necessary to input the input image for training 41 by converting the data type of the input image for training 41 into the same data type as the feature map 143a.

The first output layer 150 applies the activation function to the feature map 144a and outputs the first output image for training 101. The number of elements of the first output image for training 101 is "1024×1024×3". Here, in a case in which the data type of the first output image for training 101 is float32, the memory amount of the first output image for training 101 is 100,663,296 bits (1024×1024×3×32). In a case in which the data type of the first output image for training 101 is converted from float32 to unsigned int8, the memory amount of the first output image for training 101 is 25,165,824 bits (1024×1024×3×8).

It should be noted that FIG. 5 shows an example in which the feature map is connected to the corresponding layer between the encoder and the first decoder, but the connection from the encoder is not limited to the corresponding layer.

The second decoder does not have the skip connection from the encoder, and performs the high resolution processing on the feature map 131 from the folded layer 130 in the upsampling layers 161, 162, 163, and 164 included in the second decoder stepwise to obtain feature maps 161a, 162a, 163a, and 164a. In the example shown in FIG. 5, the feature map having a larger number of pixels, which is subjected to the high resolution processing, is output as the upsampling layer is located closer to a rear stage.

Specifically, the number of elements of the feature map 161a is "128×128×256", and the memory amount is 134,217,728 bits (128×128×256×32). The number of elements of the feature map 162a is "256×256×128", and the memory amount is 268,435,456 bits (256×256×128×32). The number of elements of the feature map 163a is "512×512×64", and the memory amount is 536,870,912 bits (512×512×64×32). The number of elements of the feature map 164a is "1024×1024×32", and the memory amount is 1,073,741,824 bits (1024×1024×32×32).

The second output layer 170 applies the activation function to the feature map 164a and outputs the second output image for training 102. The number of elements of the second output image for training 102 is "1024×1024×3". Here, in a case in which the data type of the second output image for training 102 is float32, the memory amount of the second output image for training 102 is 100,663,296 bits (1024×1024×3×32). In a case in which the data type of the second output image for training 102 is converted from float32 to unsigned int8, the memory amount of the second output image for training 102 is 25,165,824 bits (1024×1024×3×8). It is preferable that the number of pixels of the second output image for training 102 output from the second decoder is the same as the number of pixels of the first output image for training 101 output from the first decoder.

The evaluation unit 50 calculates the first loss 51 and the second loss 52 by using the source image 21, the first output image for training 101, and the second output image for training 102 which have the number of elements of "1024×1024×3".

As described above, by inputting the input image for training 41 having the number of pixels of "512×512" to the learning model 100, the first output image for training 101 and the second output image for training 102 have the number of pixels of "1024×1024" are output. That is, the learning model 100 in the example shown in FIG. 5 is a learning model that outputs an image in which the number of pixels of the input image is made 4 times and the resolution is increased. Therefore, the trained model 200 generated by training the learning model 100 shown in FIG. 5 outputs the super resolution image having the number of pixels being 4 times as large as the number of pixels of the input unknown image (input image for inference). For example, by inputting the input image for inference in which the number of pixels is "1024×1024" as the unknown image to the trained model 200 generated by training the learning model 100 shown in FIG. 5, the super resolution image having the number of pixels of "2048×2048" can be obtained.

The number of pixels of the source image 21, the input image for training 41, the first output image for training 101, and the second output image for training 102 is not limited to the example described above. For example, the learning model 100 may be designed to output an image in which the number of pixels of the input image is made 16 times, 64 times, 256 times, or the like, and the resolution is increased.

That is, in the inference unit 12, by inputting the input image for inference 201 having a first number of pixels to the trained model 200, the super resolution image 202 having a second number of pixels larger than the first number of pixels is output (see FIG. 3). The trained model 200 is generated by updating the parameter of the learning model 100 that uses the source image 21 having a third number of pixels and the input image for training 41, which is generated by performing the deterioration processing on the source image 21 and has a fourth number of pixels smaller than the third number of pixels, to output the first output image for training 101 and the second output image for training 102 which have a fifth number of pixels larger than the fourth number of pixels.

Here, the third number of pixels of the source image 21 is equal to or smaller than the first number of pixels of the input image for inference 201. A ratio of the second number of pixels of the super resolution image 202 to the first number of pixels of the input image for inference 201 is equal to a ratio of the fifth number of pixels of the first output image for training 101 and the second output image for training 102 to the fourth number of pixels of the input image for training 41. The ratio is, for example, 4 times, 16 times, 64 times, 256 times, or $2^{2n}$ times (n is a natural number equal to or larger than 1).

As described above, in addition to the structure of the U-net, by providing, in the learning model 100, the second decoder that further branches from the folded layer 130 and generates the image subjected to the high resolution processing without receiving the feature amount from the encoder, the learning model 100 can be trained to generate the output image that reflects a particularly important feature of the deteriorated image while enjoying the advantage of the U-net, which enables highly accurate and efficient training.

In image processing using the CNN, the feature extraction is often performed while reducing the resolution of the input image stepwise by downsampling. In this case, the number of pixels is smaller as the feature map is output from the convolutional layer closer to the rear stage. Therefore, in order to maintain the information amount of the entire feature map at the rear stage, it is general to increase the number of channels of the feature map.

Even in the super resolution using the U-net, in the encoder, instead of reducing the resolution of the output feature map stepwise, the number of channels is increased stepwise to maintain the information amount in a redundant manner. In the super resolution using the U-net, the super resolution with high accuracy can be realized by connecting the feature map at a stage close to the original image, which is maintained redundantly, to the decoder. The learning model composed of only the U-net has an advantage that the super resolution in which the original image corresponding to the source image 21 is restored with high accuracy can be realized.

However, in the "restoration of the original image", it is difficult to perform the super resolution exceeding the number of pixels of the source image 21. In a case of the learning model composed of only the U-net, the first output image for training 101 to be output is an image in which the typical feature of the input image for training 41 is subjected to the high resolution. Therefore, by further providing the second decoder to which an intermediate feature amount of the encoder is not connected unlike the U-net, it is possible to train the encoder and the decoder that realize the super resolution of generating the super resolution image having the number of pixels equal to or larger than the number of pixels of the source image 21.

The second output image for training 102 is an image output by using only the feature map 131 from the folded layer 130 in which the feature of the input image for training 41 is most strongly extracted for the high resolution processing without using the image data in the middle stage in which the feature extraction is performed for the high resolution processing. By configuring the learning model 100 as described above, the second loss 52 is increased at an initial stage of the training, but in a case in which the training is advanced to reduce the second loss 52, the accuracy of the feature extraction in the encoder can be improved as compared to the accuracy of the feature extraction in the encoder of the learning model composed of only the U-net, and thus the learning model 100 can output the image which strongly reflects the feature of the original image and is subjected to the high resolution processing. As a result, during the inference, the super resolution image 202 having the number of pixels equal to or larger than the number of pixels of the source image 21 used in the training can be output.

As described above, by training the learning model 100 including the first decoder to which the feature map from the encoder is connected and the second decoder to which the feature map from the encoder is not connected, the image, which strongly reflects the feature of the original image and is subjected to the high resolution processing, can be obtained. Here, the accuracy of the feature extraction of the encoder can be further improved by performing the information amount reduction processing of reducing the information amount in the feature map 131 output from the folded layer 130.

The information amount reduction processing is processing of changing the number of channels or the number of bits in the information amount (the number of elements or the memory amount) decided by the number of pixels, the number of channels, and the number of bits according to the data type. It is preferable that the information amount of the feature map 131 output by the folded layer 130 is made smaller than the information amount of the input image for training 41 by the information amount reduction processing.

In the information amount reduction processing of changing the number of channels, processing of reducing the number of channels of the feature map 131 output by the folded layer 130 is performed. Specifically, the folded layer 130 reduces the number of channels of the feature map to be input and output at a stage before or after the convolution or the pooling.

Figure 6:
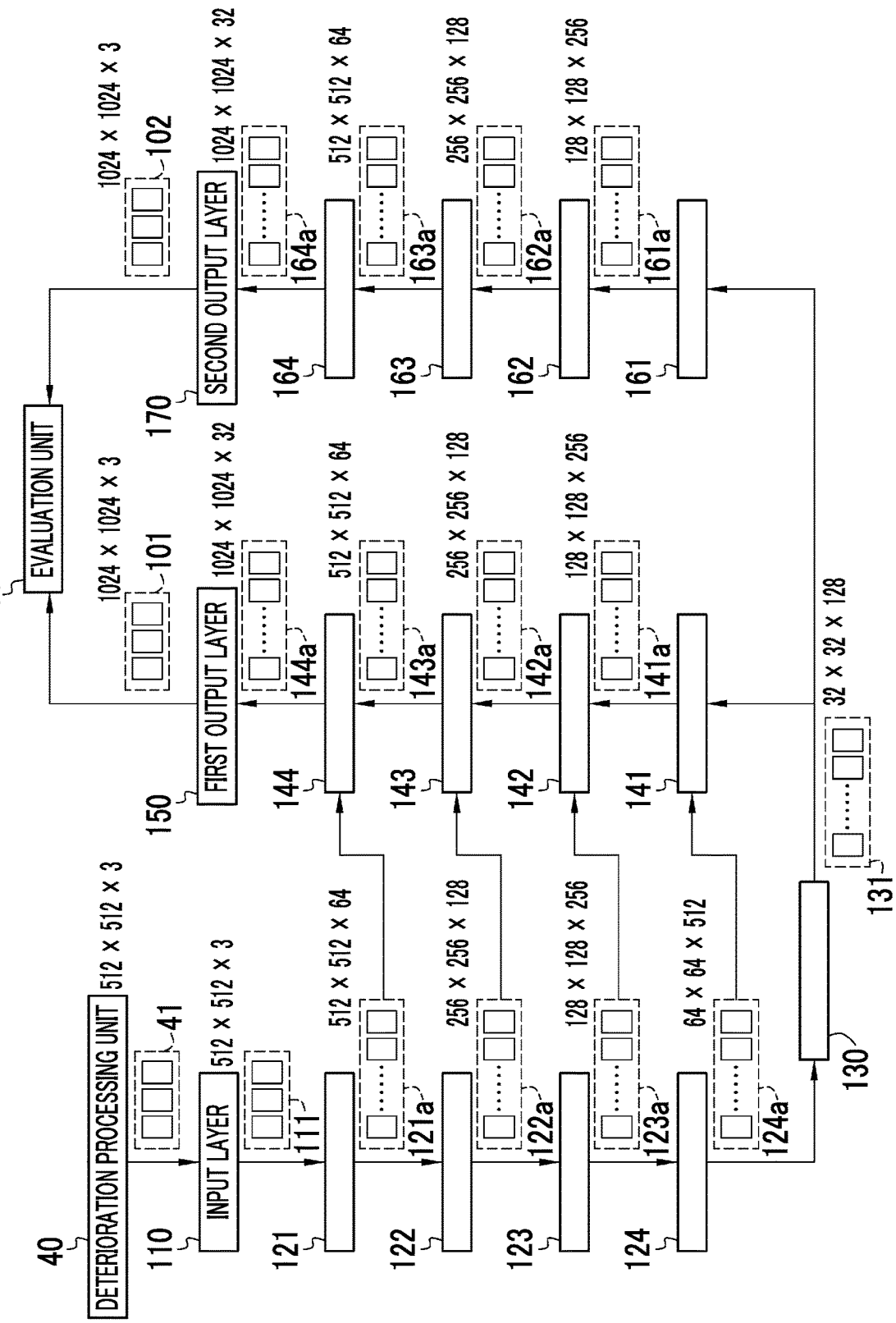
FIG. 6 is an explanatory diagram showing information amount reduction processing.

For example, as shown in FIG. 6, the number of elements (1,048,576) of the feature map 131, which is "32×32×1024" in FIG. 5, is reduced to "32×32×128" (the number of elements of 131,072). In the example shown in FIG. 6, in a case in which the data type of the feature map 131 is float32, the memory amount is reduced from 33,554,432 bits to 4,194,304 bits. In FIG. 6, since the number of elements of the input image for training 41 is "512×512×3" (the number of elements of 786,432 and the memory amount of 6,291,456 bits (512×512×3×8)), the number of elements of the feature map 131 subjected to the information amount reduction processing is smaller than the number of elements of the input image for training 41.

In the information amount reduction processing of changing the number of bits, processing of reducing the number of bits according to the data type of the feature map 131 output by the folded layer 130 is performed. Specifically, by processing of converting the data type of the feature map at a stage before or after the folded layer 130 performs the convolution or the pooling, finally, the memory amount of the feature map 131 output by the folded layer 130 is reduced.

For example, in FIG. 6, in a case in which the data type of the feature map 131 output by the folded layer 130 is converted to float16, the memory amount of the feature map 131 is 2,097,152 bits (32×32×128×16). In addition, in a case in which the data type of the feature map 131 is converted to int8, the memory amount of the feature map 131 is 1,048,576 bits (32×32×128×8).

Further, in FIG. 5 or 6, in a case in which the data type of the feature map 131 is converted into the data type in which the number of bits is 2, the memory amount of the feature map 131 is 2,097,152 bits (32×32×1024×8) or 1,048,576 bits (32×32×128×8). In a case in which the data type of the input image for training 41 (and the feature map 111) is unsigned int8, the memory amount of the input image for training 41 is 6,291,456 bits (512×512×3×8). Therefore, the memory amount of the feature map 131 subjected to the information amount reduction processing due to the combination of the reduction of the number of channels and the conversion of the data type, or the conversion of the data type is smaller than the memory amount of the input image for training 41.

As described above, by reducing the information amount of the feature map 131, which is a result of extracting the feature of the input image for training in the encoder, the second decoder generates the second output image for training 102 from the feature map having a smaller information amount. Therefore, the learning model 100 can be updated such that the accuracy of feature extraction of the encoder is further improved, and the learning model 100 can be updated such that the first output image for training 101 and the second output image for training 102 output from two decoders are the images, which more strongly reflect the feature of the input image for training 41 and are subjected to the high resolution processing.

The configuration for performing the information amount reduction processing is particularly suitable in a case in which the number of pixels of the unknown image to be input to the trained model 200 exceeds the number of pixels of the source image 21. For example, there is a case in which the number of pixels of the input image for inference 201, which is the unknown image, is "1280×960" and the number of pixels of the source image 21 is "512×512". In this case, for example, the learning model 100 is designed to output the image having the number of pixels being 64 times as large as the number of pixels of the input image for training 41, and the first output image for training 101 and the second output image for training 102 which have the number of pixels of "2048×2048" are output from the input image for training 41 in which the number of pixels is set to "256× 256" by the deterioration processing. In this case, in a case in which the input image for inference 201 in which the number of pixels is "1280×960" is input to the generated trained model 200, it is possible to generate the super resolution image 202 which has a resolution equal to or higher than 8 K and has the number of pixels of "10240× 7680".

A generative adversarial network (GAN) may be applied for optimizing the parameter of the learning model 100. The GAN is generally configured by connecting two learning models, a generator and a discriminator, and the entire network is trained by updating the parameters of the generator and the discriminator, respectively. Original known data for training or data output by the generator is input to the discriminator. The discriminator outputs a discrimination result as a result of discriminating whether the input data is the original data for training (real) or the data output by the generator (fake).

In the training of the generator, the parameter is optimized such that the data output by the generator is not discriminated as "fake" by the discriminator, in other words, such that the data output by the generator is discriminated as "real" by the discriminator. In addition, in the training of the discriminator, the parameter is optimized such that the accuracy of the real/fake discrimination is improved. The parameter is updated by using the loss calculated by applying a loss function for the discriminator and a loss function for the generator. The loss for the discriminator is calculated by applying the discrimination result output by the discriminator to the loss function for the discriminator. The loss for the generator is calculated by applying the loss for the discriminator to the loss function for the generator.

Figure 7:
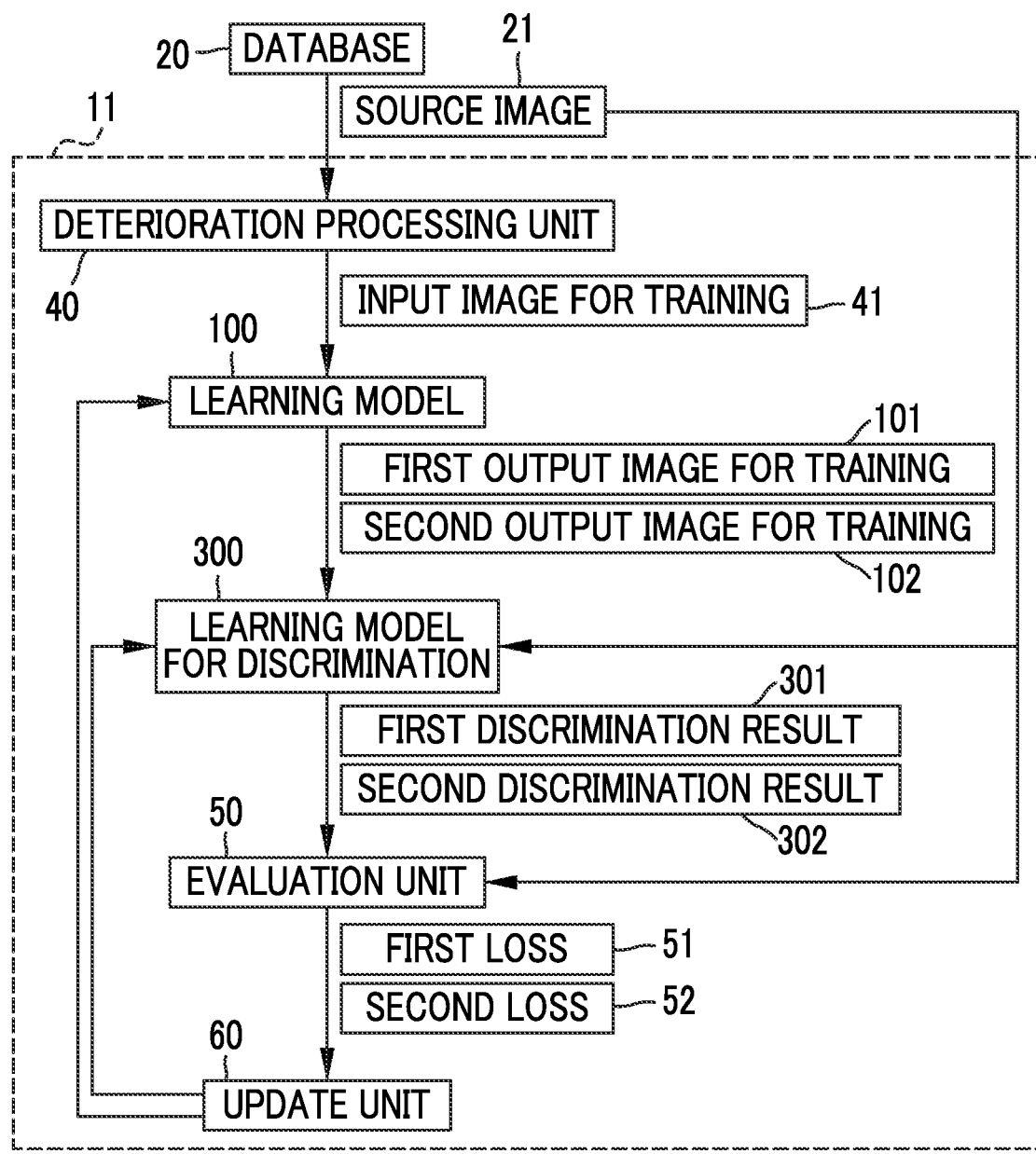
FIG. 7 is a block diagram showing a function of the learning unit in a case in which a GAN is applied.

In the present embodiment, the learning unit 11 is provided by using the learning model 100 that outputs the first output image for training 101 and the second output image for training 102 as the generator, and a learning model for discrimination 300 different from the learning model 100 which is the generator as the discriminator, as shown in FIG. 7. The learning model for discrimination 300 receives the input of the first output image for training 101 and the second output image for training 102 output by the learning model 100 to output a first discrimination result 301 and a second discrimination result 302.

The learning model for discrimination 300 is a learning model that outputs the source image 21 as "real" and an image that is not the source image 21 as "fake", and performs real/fake discrimination with respect to the first output image for training 101 and the second output image for training 102 output from the learning model 100 as the generator. The first discrimination result 301 is a result of the learning model for discrimination 300 performing the real/fake discrimination with respect to the first output image for training 101. In addition, the second discrimination result 302 is a result of the learning model for discrimination 300 performing the real/fake discrimination with respect to the second output image for training 102.

The first discrimination result 301 and the second discrimination result 302 are input to the evaluation unit 50. The evaluation unit 50 calculates a first discriminator loss by applying the first discrimination result 301 to the loss function for the discriminator and calculates a second discriminator loss by applying the second discrimination result 302 to the loss function for the discriminator, as the loss of the learning model for discrimination 300. The update unit 60 updates the learning model for discrimination 300 by optimizing the parameter of the learning model for discrimination 300 based on the first discriminator loss and the second discriminator loss.

In addition, the evaluation unit 50 calculates the first loss 51 (first generator loss) by applying the first discrimination result and the source image 21 to the loss function for the generator as the loss of the learning model 100 as the generator. That is, the first generator loss is a loss calculated by using the first discrimination result based on the first output image for training 101, and the source image 21. Similarly, the evaluation unit 50 calculates the second loss 52 (second generator loss) by applying the second discrimination result and the source image 21 to the loss function for the generator as the loss of the learning model 100. That is, the second generator loss is a loss calculated by using the first discrimination result based on the second output image for training 102, and the source image 21.

The update unit 60 updates the learning model 100 by optimizing the parameter of the learning model 100 as the generator based on the first loss 51 (first generator loss) and the second loss 52 (second generator loss). In this case, the trained model 200 (trained generator) is the learning model 100 as the trained generator. As described above, by adopting the GAN and configuring the network such that the learning model 100 is used as the generator, the super resolution with high accuracy can be realized. In particular, the configuration described above is suitable even in a case in which the number of source images 21 is small.

Figure 8:
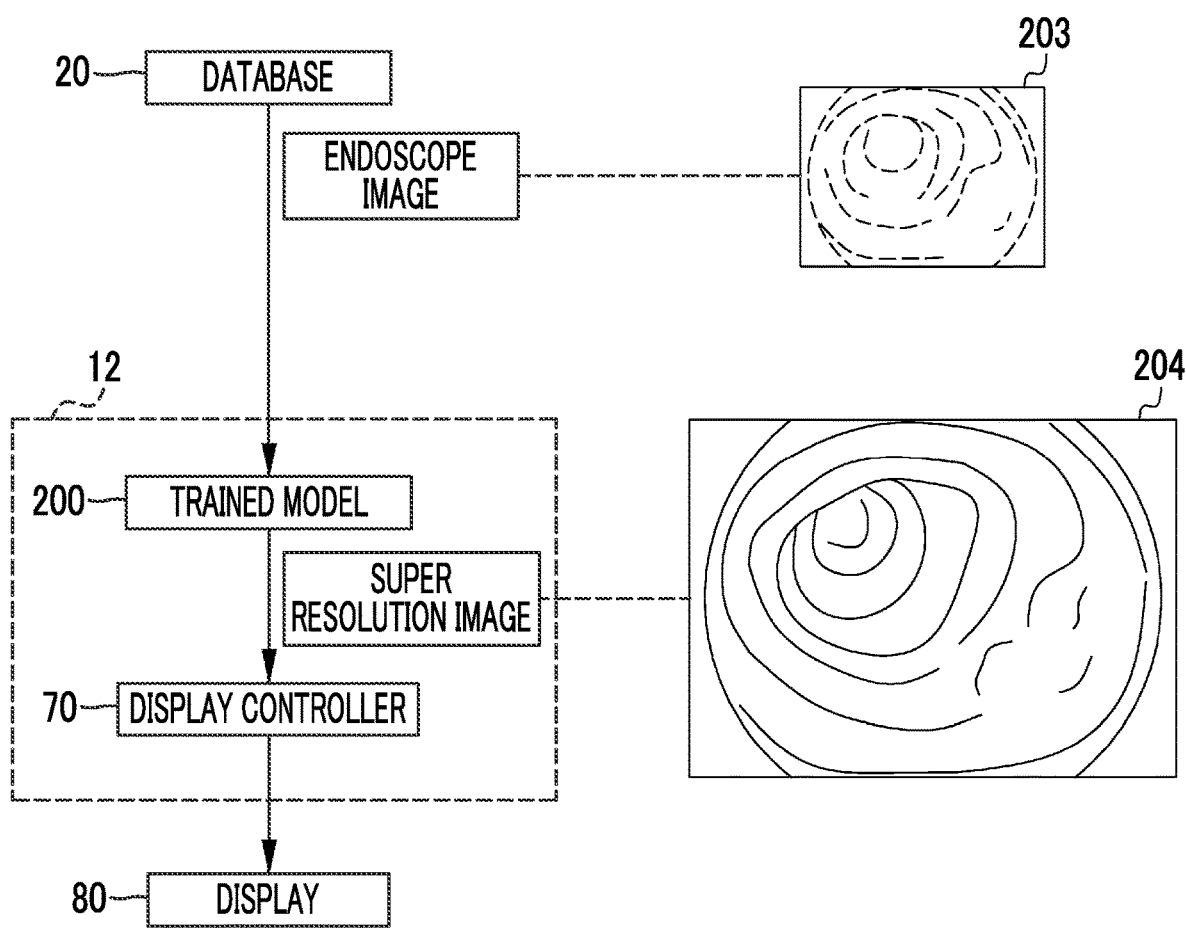
FIG. 8 is an explanatory diagram showing a function of the inference unit in a case in which an input image for inference is an endoscope image.

The trained model 200 generated by updating the learning model 100 according to the present embodiment is suitable in a case in which the input image for inference 201, which is the unknown image, is used as the endoscope image. The endoscope image is an image generated by using the modality 30 as the endoscope and imaging a subject with the endoscope. In this case, as shown in FIG. 8, the inference unit 12 inputs the endoscope image 203 having the first number of pixels stored in the database 20 to the trained model 200 to output the super resolution image 204 having the second number of pixels larger than the first number of pixels.

Figure 9:
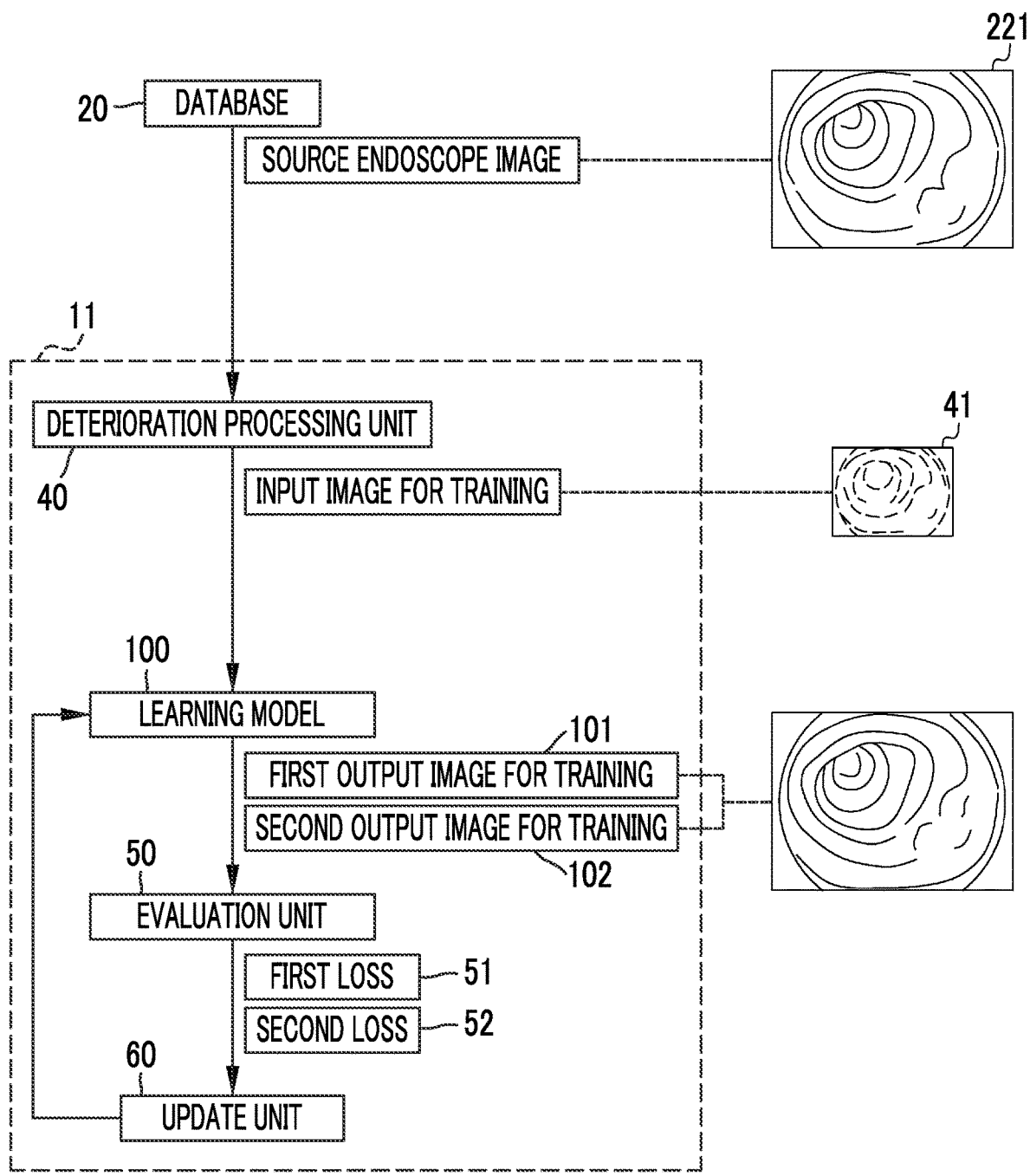
FIG. 9 is an explanatory diagram showing a function of the learning unit in a case in which the input image for inference is the endoscope image.

As shown in FIG. 9, the trained model 200 that outputs the super resolution image 204 having the second number of pixels is generated by updating, by the update unit 60, the learning model 100 that uses the input image for training 41 which is generated by performing the deterioration processing on a source endoscope image 221 having the third number of pixels and has the fourth number of pixels smaller than the third number of pixels to output the first output image for training 101 and the second output image for training 102 having the fifth number of pixels larger than the fourth number of pixels, based on the first loss 51 calculated by applying the first output image for training 101 and the source endoscope image 221 to the loss function and the second loss 52 calculated by applying the second output image for training 102 and the source endoscope image 221 to the loss function, the first loss 51 and the second loss 52 being calculated by the evaluation unit 50.

Similar to a case in which the source image 21 and the input image for inference 201 are images other than the endoscope image, a ratio of the second number of pixels of the super resolution image 204 to the first number of pixels of the endoscope image 203 is equal to a ratio of the fifth number of pixels of the first output image for training 101 and the second output image for training 102 to the fourth number of pixels of the input image for training 41.

For example, in a case in which the learning model 100 is designed to output the output image for training having the number of pixels being 4 times as large as the number of pixels of the input image for training 41, the trained model 200 receives the input of the endoscope image 203 having the number of pixels of "512×512" to output the super resolution image 204 having the number of pixels of "1024× 1024". In this case, the number of pixels of the source endoscope image 221 is set to "512×512", and the deterioration processing is performed on the source endoscope image 221 to input the input image for training 41 having the number of pixels of "256×256" to the learning model 100. The learning model 100 outputs the first output image for training 101 and the second output image for training 102, which have the number of pixels being 4 times as large as the number of pixels of the input image for training 41 and have the number of pixels of "512×512". In this case, the evaluation unit 50 calculates the first loss 51 and the second loss 52 by applying the first output image for training 101 and the second output image for training 102 which have the number of pixels of "512×512", and the source endoscope image 221 having the number of pixels of "512×512" to the loss function.

Similar to a case in which the source image 21 and the input image for inference 201 are images other than the endoscope image, the third number of pixels of the source endoscope image 221 is equal to or smaller than the first number of pixels of the endoscope image 203, which is the unknown image to be input to the trained model 200. In particular, as in the example described above, it is preferable that the third number of pixels, which is the number of pixels of the source endoscope image 221, is equal to the first number of pixels, which is the number of pixels of the endoscope image 203.

It should be noted that, in a case in which the learning model 100 is designed to output the output image for training having the number of pixels being 16 times as large as the number of pixels of the input image for training 41, and the number of pixels of the source image 21 is "512× 512", the super resolution image 204, which has a resolution equal to or higher than 4 K and has the number of pixels of "5120×3840", may be generated by inputting the endoscope image 203 having the number of pixels of "1280×960".

Figure 10:
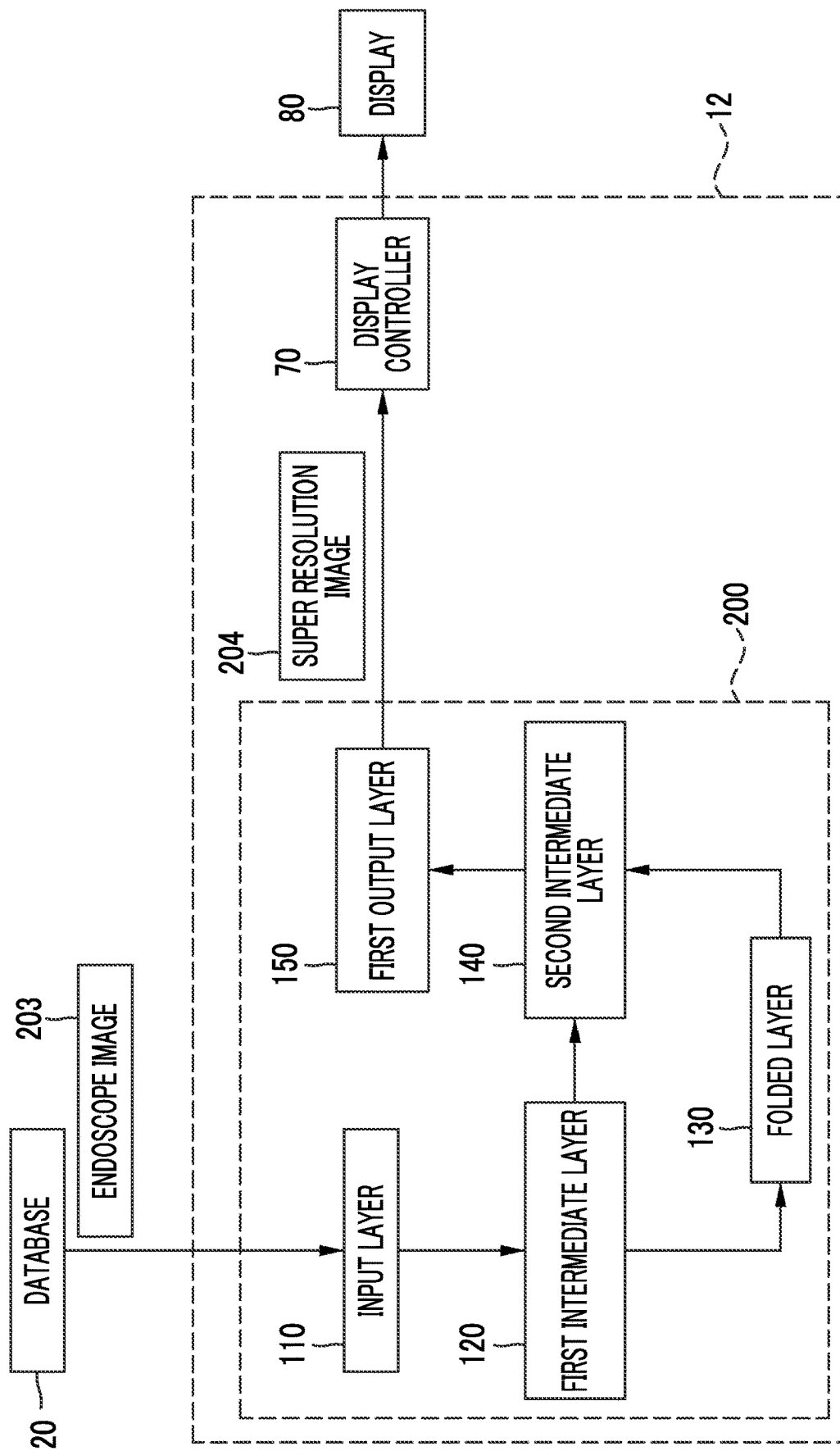
FIG. 10 is a block diagram showing a function of a trained model.

In addition, as shown in FIG. 10, it is preferable that the trained model 200 is composed of the input layer 110, the first intermediate layer 120, the folded layer 130, the second intermediate layer 140 that receives the feature map from the first intermediate layer 120, and the first output layer 150. The reason is that the third intermediate layer 160 and the second output layer 170, which are the second decoders, are required for the training of the learning model 100 in order to obtain the output image for training with higher accuracy, but it is sufficient that one decoder is provided for the output of the super resolution image from the unknown image. Also, in the trained model 200, by omitting the third intermediate layer 160 and the second output layer 170, the memory constituting the processor can be reduced, and the processing speed can be improved.

Figure 11:
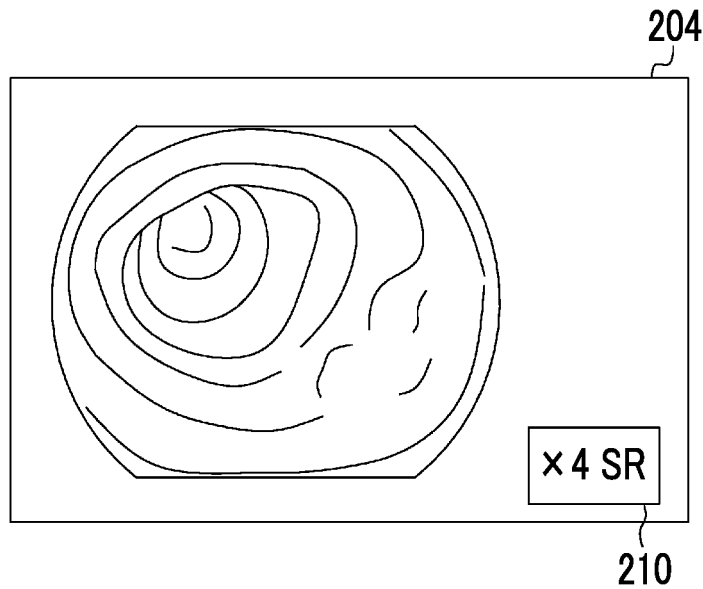
FIG. 11 is an image diagram showing an example in a case in which a super resolution image and notification display are displayed.

It is preferable that, in a case in which the super resolution image 202 received from the trained model 200 is displayed on the display 80, the display controller 70 displays the super resolution image 202 and the information indicating that the endoscope image is subjected to the high resolution processing. For example, as in the example of the super resolution image 204 shown in FIG. 11, notification display 210 indicating that the endoscope image displayed as "×4 SR" is subjected to the 4-times super resolution, is displayed on the display 80.

Since the super resolution image 204 generated by the trained model 200, which is the machine learning, is an artificially generated image, the super resolution image 204 cannot be used for diagnosis by a doctor. However, in a case in which it is desired to display the endoscope image on the large display 80, such as a scene in which the doctor shows the endoscope image to explain to a patient or a scene in which a plurality of persons observe the endoscope image, the super resolution image 204 is useful in a case in which it is desired to enlarge or observe a region of interest, such as a lesion or a treatment target. Therefore, by displaying the notification display 210 on the super resolution image 204, a person who observes the super resolution image 204 can observe the fine image subjected to the super resolution while recognizing that the image displayed on the display 80 is an artificially generated image.

The endoscope image has a standard recommended for storage in the database 20 or communication between a plurality of databases 20, so that the number of pixels of the obtained image is substantially limited. Also, it may be difficult to capture an image having a large number of pixels depending on the machine specifications of the endoscope. In such a situation, the image processing apparatus 10 according to the present embodiment, the endoscope system including the image processing apparatus 10, the endoscope, and the display 80 can generate the super resolution image having the number of pixels exceeding the limit of the number of pixels of the endoscope image that is actually obtained.

Figure 12:
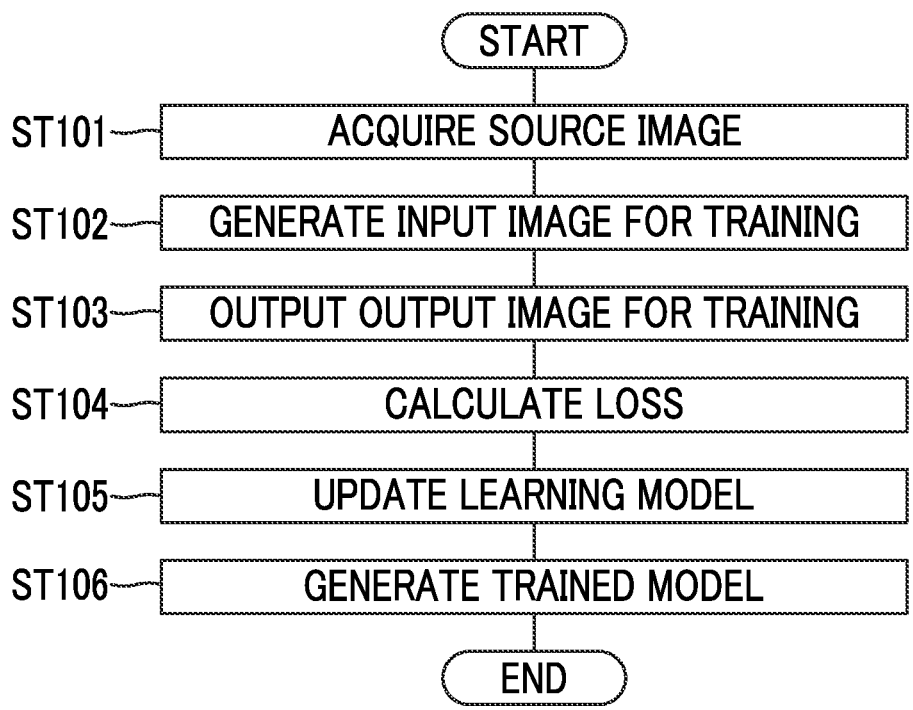
FIG. 12 is a flowchart showing a flow of functions of the present embodiment.

The series of flows of the operation method in the image processing apparatus 10 according to the present embodiment will be described with reference to the flowchart of FIG. 12. First, the learning unit 11 acquires the source image from the database 20 (step ST101). Next, the deterioration processing unit 40 performs the deterioration processing on the source image 21 to generate the input image for training 41 (step ST102). The learning unit 11 inputs the input image for training 41 to the learning model 100, and outputs the first output image for training 101 and the second output image for training 102 (collectively referred to as "output image for training" in FIG. 12) which have the number of pixels larger than the number of pixels of the input image for training 41 (step ST103). Next, the evaluation unit 50 calculates the first loss based on the first output image for training 101 and the source image 21, and further calculates the second loss based on the second output image for training 102 and the source image 21 (calculates the loss) (step ST104). Finally, by updating the learning model 100 based on the first loss and the second loss (step ST105), the trained model 200 is generated (step ST106).

In the embodiment described above, a hardware structure of the processing unit that executes various types of processing such as the deterioration processing unit 40, the learning model 100, the trained model 200, the evaluation unit 50, the update unit 60, and the display controller 70 is various processors as described below. Examples of the various processors include a central processing unit (CPU), which is a general-purpose processor that executes software (program) to function as various processing units, a programmable logic device (PLD), which is a processor of which a circuit configuration can be changed after manufacturing, such as a field programmable gate array (FPGA), and a dedicated electric circuit, which is a processor of which a circuit configuration is designed exclusively for executing various types of processing.

One processing unit may be configured by one of these various processors, or may be configured by a combination of two or more same type or different type of processors (for example, a plurality of FPGAs, or a combination of a CPU and an FPGA). In addition, a plurality of the processing units may be configured by one processor. As an example in which the plurality of processing units are configured by one processor, first, there is a form in which one processor is configured by a combination of one or more CPUs and software, and this processor functions as the plurality of processing units, as represented by a computer, such as a client or a server. Second, there is a form in which a processor, which realizes the functions of the entire system including the plurality of processing units with one integrated circuit (IC) chip, is used, as represented by a system on chip (SoC) or the like. As described above, various processing units are configured by one or more of the various processors described above, as the hardware structure.

Further, the hardware structure of these various processors is, more specifically, an electric circuit (circuitry) having a form in which circuit elements, such as semiconductor elements, are combined. In addition, the hardware structure of the storage unit is a storage device, such as a hard disc drive (HDD) or a solid state drive (SSD).

EXPLANATION OF REFERENCES

10: image processing apparatus
11: learning unit
12: inference unit
20: database
21: source image
30: modality
40: deterioration processing unit
41: input image for training
50: evaluation unit
51: first loss
52: second loss
60: update unit
70: display controller
80: display
100: learning model
101: first output image for training
102: second output image for training
110: input layer
111, 120a, 121a, 122a, 123a, 124a, 131, 140a, 141a, 142a, 143a, 144a, 160a, 161a, 162a, 163a, 164a: feature map
120: first intermediate layer
121, 122, 123, 124: convolutional layer
130: folded layer
140: second intermediate layer
141, 142, 143, 144, 161, 162, 163, 164: upsampling layer
150: first output layer
160: third intermediate layer
170: second output layer
200: trained model
201: input image for inference
202, 204: super resolution image
203: endoscope image
210: notification display
221: source endoscope image
300: learning model for discrimination
301: first discrimination result
302: second discrimination result

What is claimed is:
1. An image processing apparatus comprising:
a processor configured to:
acquire a source image;
generate an input image for training by deterioration processing on the source image;
input the input image for training to a learning model to output a first output image for training and a second output image for training which have the number of pixels larger than the number of pixels of the input image for training;
calculate a first loss based on the first output image for training and the source image;
calculate a second loss based on the second output image for training and the source image; and
update the learning model based on the first loss and the second loss to generate a trained model,
wherein the learning model includes an input layer, a first intermediate layer, a folded layer, a second intermediate layer, a first output layer, a third intermediate layer, and a second output layer,
the input layer receives input of the input image for training to output a feature map to be input to the first intermediate layer,
the first intermediate layer receives input of the feature map output from the input layer to output the feature map to be input to the folded layer and the second intermediate layer,
the folded layer outputs the feature map to be input to the second intermediate layer and the third intermediate layer based on the feature map input from the first intermediate layer,
the second intermediate layer outputs the feature map to be input to the first output layer based on the feature map input from the folded layer and the feature map input from the first intermediate layer,
the first output layer outputs the first output image for training based on the feature map input from the second intermediate layer,
the third intermediate layer outputs the feature map to be input to the second output layer based on the feature map input from the folded layer, and the second output layer outputs the second output image for training based on the feature map input from the third intermediate layer.

2. The image processing apparatus according to claim 1, wherein information amounts of the input image for training, the first output image for training, the second output image for training, and the feature map are decided by the number of pixels, the number of channels, and the number of bits according to a data type, and the folded layer makes the information amount of the feature map output from the folded layer smaller than the information amount of the input image for training by performing information amount reduction processing of changing the number of channels or the number of bits.

3. The image processing apparatus according to claim 2, wherein the information amount reduction processing is processing of reducing the number of channels.

4. The image processing apparatus according to claim 2, wherein the information amount reduction processing is processing of reducing the number of bits.

5. The image processing apparatus according to claim 3, wherein the first intermediate layer performs processing of reducing the number of pixels of the feature map input from the input layer.

6. The image processing apparatus according to claim 5, wherein the second intermediate layer and the third intermediate layer perform processing of increasing the number of pixels of the feature map input from the folded layer.

7. The image processing apparatus according to claim 1, wherein the deterioration processing includes processing of reducing the number of pixels of the source image.

8. The image processing apparatus according to claim 7, wherein the deterioration processing includes filter processing and/or noise addition processing.

9. The image processing apparatus according to claim 1, wherein the processor is configured to further input the input image for training to the second intermediate layer.

10. The image processing apparatus according to claim 1, wherein the processor is configured to input an input image for inference having a first number of pixels to the trained model to output a super resolution image having a second number of pixels larger than the first number of pixels, and a ratio of the second number of pixels to the first number of pixels is equal to a ratio of the number of pixels of the first output image for training and the second output image for training to the number of pixels of the input image for training.

11. An operation method of an image processing apparatus, the method comprising:
acquiring a source image;
generating an input image for training by deterioration processing on the source image;
inputting the input image for training to a learning model to output a first output image for training and a second output image for training which have the number of pixels larger than the number of pixels of the input image for training;
calculating a first loss based on the first output image for training and the source image;
calculating a second loss based on the second output image for training and the source image; and
updating the learning model based on the first loss and the second loss to generate a trained model,
wherein the learning model includes an input layer, a first intermediate layer, a folded layer, a second intermediate layer, a first output layer, a third intermediate layer, and a second output layer,
the input layer receives input of the input image for training to output a feature map to be input to the first intermediate layer,
the first intermediate layer receives input of the feature map output from the input layer to output the feature map to be input to the folded layer and the second intermediate layer,
the folded layer outputs the feature map to be input to the second intermediate layer and the third intermediate layer based on the feature map input from the first intermediate layer,
the second intermediate layer outputs the feature map to be input to the first output layer based on the feature map input from the folded layer and the feature map input from the first intermediate layer,
the first output layer outputs the first output image for training based on the feature map input from the second intermediate layer,
the third intermediate layer outputs the feature map to be input to the second output layer based on the feature map input from the folded layer, and
the second output layer outputs the second output image for training based on the feature map input from the third intermediate layer.

12. An image processing apparatus comprising:
a processor configured to:
acquire a source image;
generate an input image for training by deterioration processing on the source image;
input the input image for training to a generator to output a first output image for training and a second output image for training which have the number of pixels larger than the number of pixels of the input image for training;
input the first output image for training and the second output image for training to a discriminator to output a first discrimination result based on the first output image for training and a second discrimination result based on the second output image for training;
calculate a first discriminator loss based on the first discrimination result and a second discriminator loss based on the second discrimination result;
update the discriminator based on the first discriminator loss and the second discriminator loss;
calculate a first generator loss based on the first discrimination result and the source image and a second generator loss based on the second discrimination result and the source image; and
update the generator based on the first generator loss and the second generator loss to generate a trained generator,
wherein the generator includes an input layer, a first intermediate layer, a folded layer, a second intermediate layer, a first output layer, a third intermediate layer, and a second output layer,
the input layer receives input of the input image for training to output a feature map to be input to the first intermediate layer, the first intermediate layer receives input of the feature map output from the input layer to output the feature map to be input to the folded layer and the second intermediate layer, the folded layer outputs the feature map to be input to the second intermediate layer and the third intermediate layer based on the feature map input from the first intermediate layer, the second intermediate layer outputs the feature map to be input to the first output layer based on the feature map input from the folded layer and the feature map input from the first intermediate layer, the first output layer outputs the first output image for training based on the feature map input from the second intermediate layer, the third intermediate layer outputs the feature map to be input to the second output layer based on the feature map input from the folded layer, and the second output layer outputs the second output image for training based on the feature map input from the third intermediate layer.

13. An image processing apparatus comprising:
a processor configured to:
   acquire an endoscope image having a first number of pixels; and
   input the endoscope image to a trained model to output a super resolution image having a second number of pixels larger than the first number of pixels, and
wherein the trained model is generated by updating a learning model based on a first loss and a second loss,
the learning model uses an input image for training having a fourth number of pixels smaller than a third number of pixels, which is generated by performing deterioration processing on a source endoscope image having the third number of pixels equal to or smaller than the first number of pixels, to output a first output image for training and a second output image for training which have a fifth number of pixels larger than the fourth number of pixels,
the first loss is based on the first output image for training and the source endoscope image, and
the second loss is based on the second output image for training and the source endoscope image.

14. The image processing apparatus according to claim 13,
wherein the processor is configured to perform control of displaying the super resolution image and information indicating that the endoscope image is subjected to high resolution processing.

15. The image processing apparatus according to claim 13,
wherein a ratio of the second number of pixels to the first number of pixels is equal to a ratio of the fifth number of pixels to the fourth number of pixels.

16. The image processing apparatus according to claim 15,
wherein the third number of pixels is equal to the first number of pixels.

17. An endoscope system comprising:
the image processing apparatus according to claim 13;
an endoscope that images a subject to generate the endoscope image; and
a display,
wherein the processor is configured to perform control of displaying the super resolution image on the display.

* * * * *